United States Patent [19]
Heller et al.

[11] Patent Number: 6,119,146
[45] Date of Patent: Sep. 12, 2000

[54] COMPUTER NETWORK HAVING MULTIPLE REMOTELY LOCATED HUMAN INTERFACES SHARING A COMMON COMPUTING SYSTEM

[75] Inventors: Andrew Heller; Barry Thornton; Daniel Barrett, all of Austin; Charles Ely, Horseshoe Bay, all of Tex.

[73] Assignee: INT Labs, Inc., Austin, Tex.

[21] Appl. No.: 09/072,216

[22] Filed: May 4, 1998

[51] Int. Cl.[7] .................................................. G06F 15/16
[52] U.S. Cl. ..................... 709/203; 709/223; 709/224; 709/238; 709/239; 709/246; 345/125; 345/326; 364/229; 361/683
[58] Field of Search ........................... 395/200.8, 200.76, 395/200.68, 200.69; 345/125, 326; 709/224, 203, 223, 238, 239, 246

[56] References Cited

U.S. PATENT DOCUMENTS

| | | | |
|---|---|---|---|
| 3,725,866 | 4/1973 | Pldfield, Jr. et al. | 709/227 |
| 4,484,306 | 11/1984 | Kulczyckyj et al. | 364/918.4 |
| 5,150,243 | 9/1992 | Suzuki | 348/465 |
| 5,260,697 | 11/1993 | Barrett et al. | 356/5.06 |
| 5,337,413 | 8/1994 | Lui et al. | 710/2 |
| 5,347,167 | 9/1994 | Singh | 307/125 |
| 5,485,570 | 1/1996 | Bushboom et la. | 345/531 |
| 5,499,377 | 3/1996 | Lee | 709/244 |
| 5,550,593 | 8/1996 | Nakabayashi | 348/465 |
| 5,557,775 | 9/1996 | Shedlesky | 395/500.35 |
| 5,577,205 | 11/1996 | Hwang et al. | 710/101 |
| 5,598,401 | 1/1997 | Blackwell et al. | 320/385 |
| 5,675,811 | 10/1997 | Broedner et al. | 713/323 |
| 5,715,410 | 2/1998 | Kim | 710/129 |
| 5,734,834 | 3/1998 | Yoneyama | 709/226 |
| 5,748,890 | 5/1998 | Goldberg et al. | 713/202 |
| 5,801,689 | 9/1998 | Huntsman | 709/208 |
| 5,802,281 | 9/1998 | Clapp et al. | 709/228 |
| 5,831,608 | 11/1998 | Janay et al. | 345/334 |

*Primary Examiner*—Zarni Maung
*Assistant Examiner*—Hieu C. Le
*Attorney, Agent, or Firm*—Haynes and Boone, LLP

[57] ABSTRACT

A computer network having multiple remotely located human interfaces which share a common computing system which appears, to each of the human interfaces, as a virtual computer dedicated to that human interface. The computer network includes a processor subsystem and a plurality of nodes, each coupled to the processor subsystem and having a remotely located human interface comprised of a video monitor and an I/O device coupled thereto. Each one of the nodes further incudes a first interface device coupled to the processor subsystem and to a transmission line while each of the human interfaces further includes a second interface device coupled to the video monitor, the I/O device and the transmission line. The computer network further includes a memory subsystem coupled to the processor subsystem and having a plurality of memory areas, each corresponding to one of the plurality of nodes. Using information stored in each one of the plurality of memory areas, the processor subsystem appears, to the corresponding one of the plurality of nodes, as a dedicated processor for the human interface coupled to the node.

7 Claims, 4 Drawing Sheets

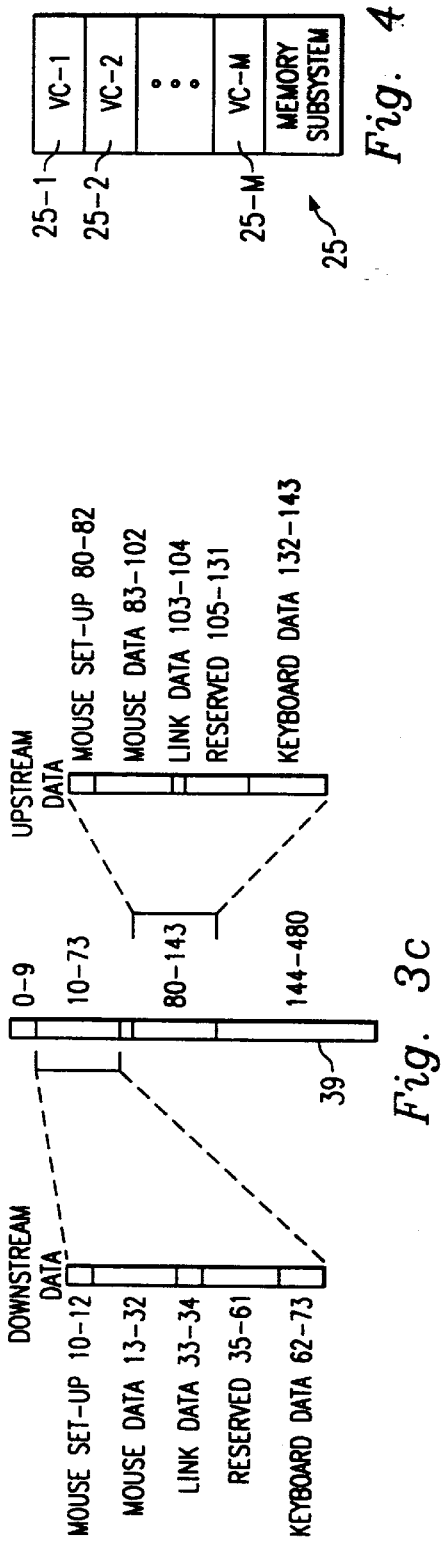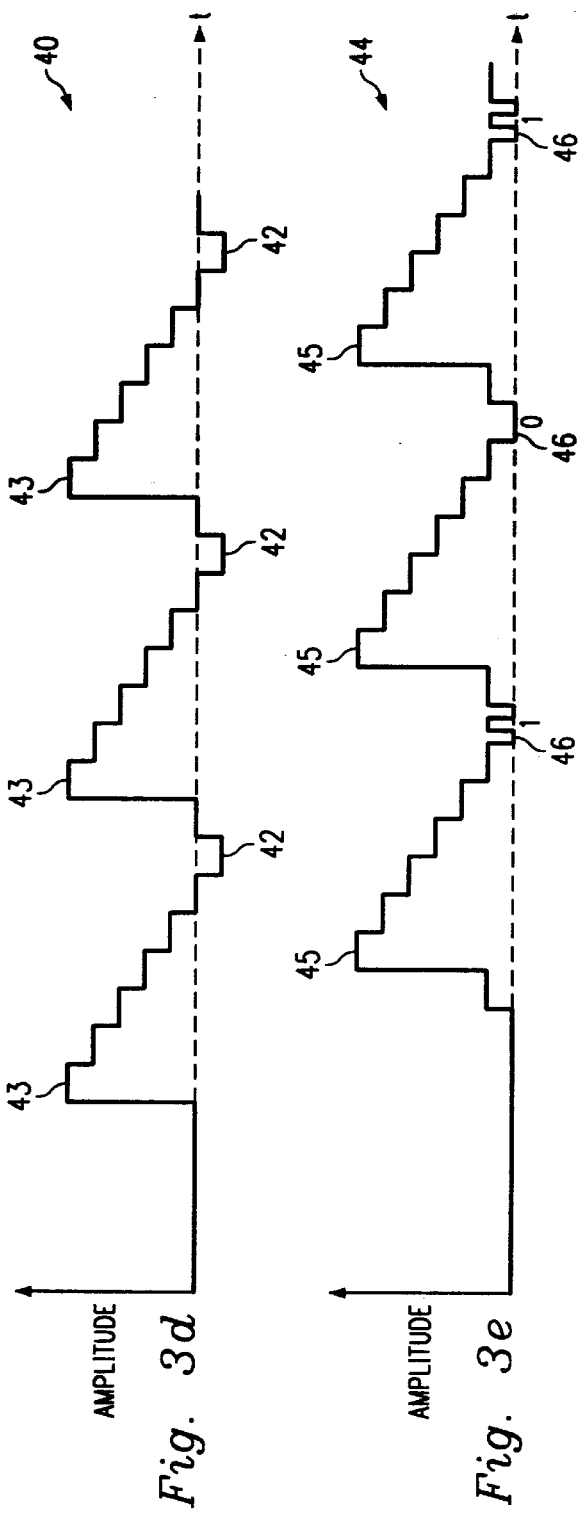

COMPUTER NETWORK HAVING MULTIPLE REMOTELY LOCATED HUMAN INTERFACES SHARING A COMMON COMPUTING SYSTEM

CROSS-REFERENCE TO RELATED APPLICATIONS

This application is related to U.S. patent application Ser. No. 09/072,320 (Atty. Docket No. 10393.42) entitled COMPUTER SYSTEM HAVING REMOTELY LOCATED I/O DEVICES, Ser. No. 09/071,604 (Atty. Docket No. 10393.44) entitled COMPUTER NETWORK HAVING COMMONLY LOCATED COMPUTING SYSTEMS and Ser. No. 09/072,382 (Atty. Docket No. 10393.47) entitled METHOD FOR INCORPORATING COMPUTER DATA INTO AN ANALOG VIDEO STREAM AND AN ASSOCIATED COMPUTER SYSTEM HAVING REMOTELY LOCATED I/O DEVICES, all of which were filed on even date herewith, assigned to the Assignee of the present application and are hereby incorporated by reference as if reproduced in their entirety.

TECHNICAL FIELD

The invention relates generally to computer networks and, more particularly, to a computer network which includes a common computing system shared by multiple remotely located human interfaces.

BACKGROUND OF THE INVENTION

In its broadest sense, a computer network is a set of nodes and communication channels which interconnect the set of nodes. The nodes may be computers, terminals, workstations, or communication units of various kinds and may be distributed at different locations. They communicate over the communication channels which are provided by the owner of the computer network or leased from a common carrier. These communication channels may use a variety of transmission media such as optical fibers, coaxial cable or twisted copper pairs. A local area network (or "LAN") is a computer network at a single site and, in many cases, is confined to a single building. A wide area network (or "WAN") is a computer network that uses either a public or private switching system to interconnect computers located at plural sites which may be separated by hundreds or thousands of miles.

There are a number of advantages to constructing a computer network. They include resource and data sharing, and communication and data exchange. Resource sharing provides users with convenient access to special computing resources, regardless of their physical location. Data sharing provides users with access to common databases. Data exchanges enable users to exchange data files while communication exchanges enable users to exchange messages, for example, via electronic mail (or "E-mail"). While networks may be arranged in a variety of configurations, a commonly used network design has a bus (also known as a "linear") topology in which a single network cable is routed through those locations where a data terminal equipment (or "DTE") device is to be connected to the network. At each of these locations, a physical connection (or "tap") is made to the cable to allow the DTE at that location to access the network.

At selected nodes of such a network, file servers or other large scale computer systems may provide network services while, at others of the nodes, individual workstations, each typically comprised of a personal computer (or "PC"), desktop computer, or other type of physically compact computer system capable of both operating as a standalone computer and accessing the network services, reside. While the precise configuration of any particular network will vary, for most networks used in business, PCs located at individual workstations predominate.

The components of the PC (as well as all other computer systems such as minicomputers and mainframes) may be divided into two functional units—the computing system and the human interface to the computing system For a PC, the computing system is, quite simply, the chassis and those devices—the motherboard, hard drive and the like—which reside within the chassis. The human interface, on the other hand, are those devices that humans use to transfer information to and/or receive information from the computing system. The most commonly recognized devices which form part of the human interface with the computing system include the monitor, keyboard, mouse and printer. Of course, a variety of other devices, for example, a joystick, trackball, touchpad or others too numerous to specifically mention, may form part of the human interface. For most PCs installed at workstations, the computer monitor, keyboard and mouse rest on the desktop while the computer chassis which holds the computing system rests on the floor underneath the desktop.

While the above-described network configuration is quite common in many business establishments, recently, a number of issues, in particular, security concerns, have been raised in connection with such network designs. Business contacts, vendor information, contracts, reports, compilations, proprietary software, access codes, protocols, correspondence, account records, business plans are just some of the fundamental assets of a company which are oftentimes accessible from an employee's computer where it can be quickly copied onto a floppy disk and stolen.

Disk and CD drives may also be used to introduce illegal, inappropriate or dangerous software to a computer. Storing bootlegged software can expose a company to copyright infringement claims. Computer games often reduce employee productivity. If imported onto a computer system, computer pornography may create a hostile work environment which leads to a sexual discrimination lawsuit against the company. Computer viruses can cause the loss of critical information stored on a computer. Finally, the computing system itself may be damaged or otherwise misconfigured when left accessible to technically oriented employees who take it upon themselves to attempt to repair and/or modify the computer system.

Another concern often raised in connection with the present practice of placing the computer system at the desktop is that such workstation designs actually work against proper maintenance of the computing system. When placed underneath the desktop, computing systems are often forced to absorb physical shocks when accidentally kicked, knocked over or struck by falling objects, any of which could result in damage to the various electronic components, located within the chassis, which comprises the computing system. Oftentimes, a computing system is placed in a "convenient" location and not in a location designed to keep it cool. A computer system typically includes a cyclonic fan designed to direct a constant flow of cooling area at the heat-generating components of the computing system. However, if a barrier is placed a few inches in front of the fan intake, the efficiency of the fan is reduced dramatically. Similarly, placing the computer system against a wall or running cables in front of the fan adversely affects the ability of the fan to properly cool the computing system. Finally, even in relatively clean office environments, the fan tends to draw in dirt and other dust particles into the interior of the computer chassis where they are deposited on the heat-generating electronic components which comprise the computing system. As dust tends to insulate the components on which it is deposited, the ability of such components to dissipate heat becomes degraded when a layer of dust collects on the component.

Logistical support, too, becomes a vexing problem for computer-intensive organizations when computing systems are scattered throughout a facility. When machine failures occur, the repair person must go to the machine to diagnose and repair the machine. Oftentimes, this entails multiple visits to the machine's location, particularly when the first examination reveals that replacement parts or a replacement machine are needed. Similarly, software upgrades and other performance checks become quite time-consuming tasks when personnel must travel to each machine where the software resides locally.

Finally, many office buildings were designed before the advent of the age of the PC. As a single PC can consume over 300 watts of power, a heavily computerized workplace could potentially demand power in excess of the amount available. Similarly, the heat generated by the large number of computers installed in modern workplaces can easily overwhelm the air conditioning capacity of a building's HVAC system, thereby causing room temperatures to rise above those levels preferred by the occupants of the building. This problem is expected to worsen as more computer systems include advanced processor subsystems, for example, those which include a Pentium II microprocessor manufactured by Intel Corporation of Santa Clara, Calif., which tend to generate greater amounts of heat than earlier, less powerful, processor subsystems.

By securing plural computing systems in one room, it is contemplated that many of the aforementioned security and maintenance concerns would be relieved. However, since most PCs are located at individual work stations and/or offices widely scattered throughout a place of business, to place the computing systems for multiple PCs in a common location, for example, inside a selected room, would result in the human interfaces being located at considerable distances from the computing systems coupled thereto. Traditionally, when coupling the computing system to the human interface, separate cables have been used for the analog video information stream generated by the computing system for propagation to the video monitor and the bi-directional digital data signals which are exchanged between the computing system and the remaining I/O devices such as the keyboard, mouse and printer which form part of the human interface. For example, a system may use three pairs of cables for the analog video information stream, one pair for the video synchronization information and one pair for the bi-directional digital data signals for each I/O device located at the human interface.

While simply lengthening the cables which couple the human interface to the computing system may appear to be a solution to the problem of multiple remotely located human interfaces which results when the associated computing systems are housed together, for example, in a common room, such a solution is not feasible because, as the distance between the human interface and the computing system is increased, the requisite size of the connecting cables also increases. As a result, the number and size of the cables needed to couple the various human interfaces to the associated computing systems would not only be unwieldy, it would be prohibitively expensive to install, particularly if one wanted to place large numbers of computing systems in the controlled access room and disburse the associated human interfaces throughout a building or office complex.

These concerns have also been driving the development of the network computer (or "NC") and other so-called "thin" computer solutions. While various NC designs have been proposed, most entail removal of the auxiliary memory (also known as the hard drive) and substantially reducing the size of the processor. All software applications and data files would be stored on the network and the NC would be limited to accesses of network software and data files. Most NC designs also propose that all disk drives (typically, the CD and floppy drives) be removed, thereby eliminating the ability of the NC user to import or export software applications and/or data files.

While the development of the NC is, at least in part, due to a recognition by the computer industry of security and other problems which have arisen during the evolution of computer networks, the NC is not a fully satisfactory solution to these problems. While removing some of the processing capability from the workstation, most NC designs propose leaving sufficient intelligence at the workstation to access the internet, load software applications retrieved from the network memory and perform other operations. In fact, many NCs hope to avoid the aforementioned cabling problems which arise for remotely located workstations by leaving sufficient intelligence at the NC to generate the stream of video information used by the video monitor to generate a display. Thus, while reduced in complexity, NCs will still have the maintenance, power and cooling concerns of existing PCs and other computer systems. Thus, while the NC represents a step in the right direction, many of the aforementioned issues cannot be resolved by wide-scale implementation of NCs.

In order to fully resolve the aforementioned issues, the entire computing system needs to be physically separated from the human interface. In our co-pending application Ser. No. 09/071,604 (Atty. Docket No. 10393.44) and previously incorporated by reference, we proposed keeping the human interface (monitor, keyboard, mouse and printer) at the workstation while relocating the associated computing system (chassis holding the motherboard, power supply, memory, disk drives, etc.) to a secured computer room where plural computing systems are maintained, for example, in a common support structure such as a rack. By securing the computing systems in one room, the employer's control over the computer systems would be greatly enhanced. For example, since employees would no longer have personal access, through the floppy or CD drive, to the memory subsystem, employees could not surreptitiously remove information from their computing system. Nor could the employee independently load software or other data files onto their computing system. Similarly, the employee could no longer physically change settings or otherwise modify the hardware portion of the computer. Maintenance would be greatly facilitated by placement of all of the computing systems in a common room. For example, the repair technicians and their equipment could be stationed in the same room with all of the computing systems. Thus, a technician could replace failed components or even swap out the entire unit without making repeated trips to the location of the malfunctioning machine. Such a room could be provided with special HVAC and power systems to ensure that the room is kept clean, cool and fully powered.

Recognizing that a network in which multiple computing systems, each coupled to a remotely located human interface still has considerable maintenance demands, we now propose to further simplify the network by coupling all of the remotely located human interfaces to a common computing system which presents itself as a virtual computing system to each of the human interfaces coupled thereto. It is, therefore, the object of this invention to provide such a computer network.

SUMMARY OF THE INVENTION

In one embodiment, the present invention is of a computer network which includes a computing system and a plurality of human interfaces, each remotely located relative to the computing system. To the plurality of human interfaces, the computing system appears as a corresponding plurality of computing systems. The computer network further includes an interconnection system which includes, for each of the human interfaces, a first interface device coupled to the human interfaces, a second interface device coupled to the computing system and a transmission line, such as a 4-wire cable, coupling the first and second interface devices. The first interface device converts signals generated by the human interface into a format suitable for transmission to the second interface device and the second interface device converts signals, received from the first interface device into a format suitable for transmission to the computing system. Conversely, the second interface device converts signals generated by the computing system into a format suitable for transmission to the first interface device and the first interface device converts signals, received from the second interface device into a format suitable for transmission to the human interface.

In one aspect thereof, the computing system includes a processor subsystem coupled to the second interface device for each of the human interfaces and a memory subsystem coupled to the processor subsystem. The memory subsystem is subdivided into a plurality of memory areas, each corresponding to one of the human interfaces, such that the processor subsystem uses information stored in each one of the plurality of memory areas to represent, to the corresponding one of the plurality of human interfaces, that the processor subsystem is dedicated to the corresponding one of the plurality of human interfaces. In another aspect thereof, the second interface device for each one of the plurality of human interfaces resides on an I/O interface card coupled to the processor subsystem. For a human interface comprised of a video monitor and an I/O device, the I/O interface card preferably includes, a video controller and a first I/O device controller, each coupled between the processor subsystem and the second interface device. In a further aspect thereof, the I/O interface card is insertably mounted in a slot of a main system bus which couples the processor subsystem and the memory subsystem of the computing system.

In another embodiment, the present invention is of a computer network comprised of a processor subsystem and a plurality of nodes, each coupled to the processor subsystem and having a remotely located human interface coupled thereto. A memory subsystem which includes a plurality of memory areas, each corresponding to one of the plurality of nodes, is coupled to the processor subsystem. Using information stored in each one of the plurality of memory areas, the processor subsystems appears, to the corresponding one of the plurality of nodes, as a dedicated processor for the human interface coupled to the node.

In one aspect thereof, each of the remotely located interfaces is comprised of a video monitor and at least one I/O device. In another, each one of the plurality of nodes further comprises a first interface device while each one of the corresponding plurality of human interfaces further comprises a second interface device coupled to the video monitor and the at least one I/O device. In this aspect, the computer network would also include a transmission line coupling the first interface device and the second interface device. The first interface device converting video signals to be transmitted to the video monitor and non-video signals to be transmitted to the at lest one I/O device into a signal having a format suitable for transmission to the second interface device and the second interface re-converting the received signal back into the video signal and the non-video signal for respective propagation to the video monitor and the at least one I/O device.

In another embodiment, the present invention is of a computer network which includes a processor subsystem and a plurality of nodes, each coupled to the processor subsystem and having a remotely located human interface comprised of a video monitor and an I/O device coupled thereto. Each one of the nodes further incudes a first interface device coupled to the processor subsystem and to a transmission line while each of the human interfaces further includes a second interface device coupled to the video monitor, the I/O device and the transmission line. The computer network further includes a memory subsystem coupled to the processor subsystem and having a plurality of memory areas, each corresponding to one of the plurality of nodes. Using information stored in each one of the plurality of memory areas, the processor subsystem appears, to the corresponding one of the plurality of nodes, as a dedicated processor for the human interface coupled to the node.

In this embodiment of the invention, the first interface device is comprised of a video encoder coupled to the processor subsystem and the transmission line and a first transceiver coupled to the computing system and the transmission line while the second interface device is comprised of a video decoder coupled to the transmission line and a second transceiver coupled to the transmission line and the I/O device. The video encoder places a stream of video information received from the processor subsystem onto the transmission line while the first transceiver injects a first set of data signals received from the processor subsystem into the stream of video information. The second transceiver receives the stream of video information in which the first set of data signals were injected and removes the first set of data signals from the stream of video information. The second transceiver also receives a second set of data signals from the I/O device and injects the second set of data signals into the stream of video information while the first transceiver receiving the stream of video information in which the second set of data signals were injected and removes the second set of data signals from the stream of video.

In one aspect thereof, the first transceiver receives at least one synchronization pulse sequence from the processor subsystem and injects the first set of data signals into the stream of video information based upon a first count of blanking pulses in the at least one received synchronization pulse sequence. In another aspect thereof, the second transceiver is coupled to the video decoder to receive the at least one synchronization pulse sequence therefrom and removes the first set of data signals from the stream of video information based upon a second count of blanking pulses in the at least one received synchronization pulse sequence. In still other aspects thereof, the second transceiver injects the second set of data signals into the stream of video information based upon the second count of blanking pulses in the at least one received synchronization pulse sequence and the first transceiver receives the stream of video from the video encoder and removes the second set of data signals from the stream of video information based upon a comparison of the stream of video received from the video encoder and the stream of video information received from the transmission line.

BRIEF DESCRIPTION OF THE DRAWINGS

FIG. 3c illustrates an allocation of selected portions of the stream of video information to carry digital data.

FIG. 3d illustrates a video information stream.

FIG. 3e illustrates the video information stream of FIG. 3d after the injection of digital data thereinto.

FIG. 4 is an expanded block diagram of a memory subsystem of the file server of FIG. 1.

DETAILED DESCRIPTION OF THE PREFERRED EMBODIMENT

Figure 1:
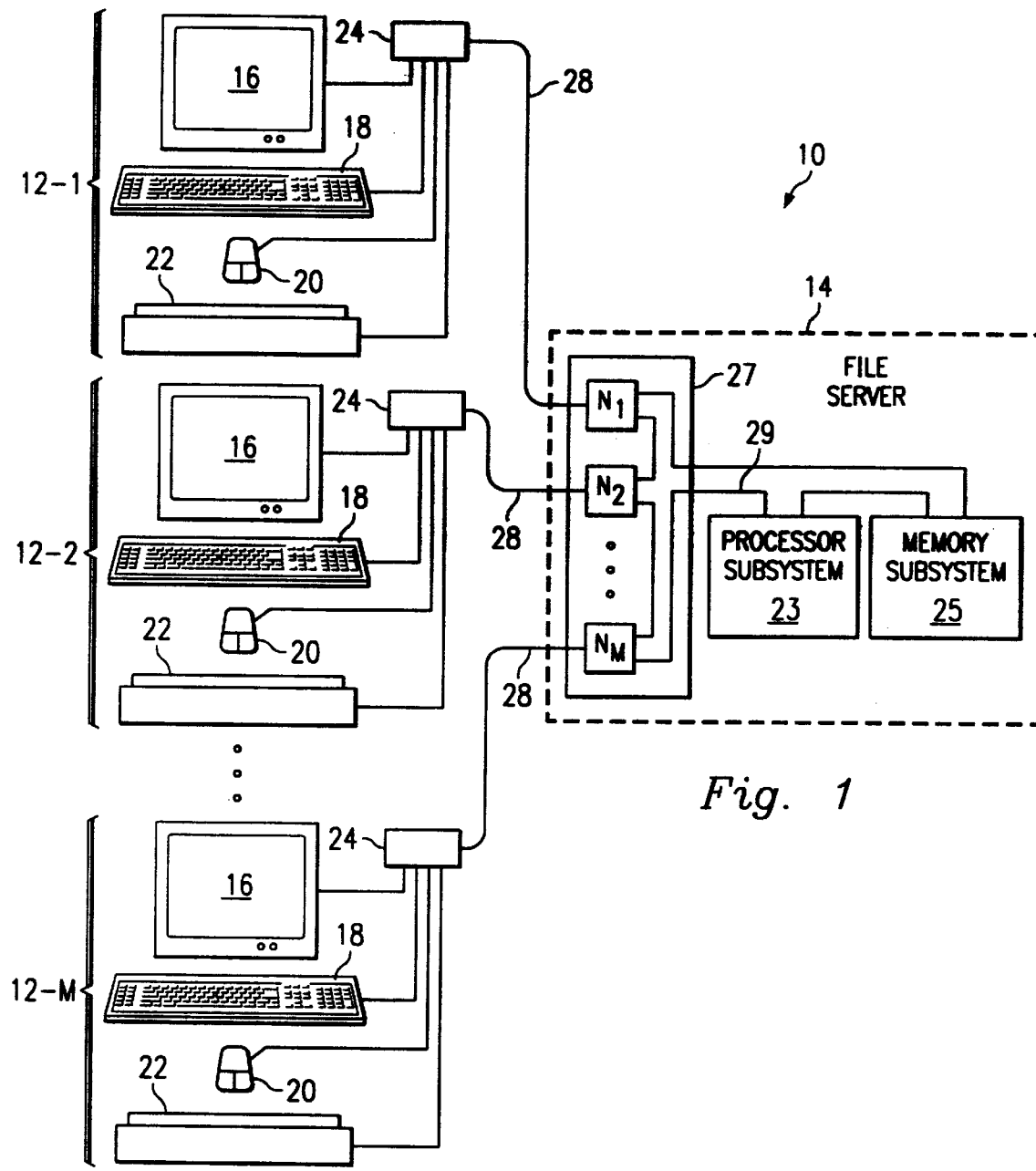
FIG. 1 is a block diagram of a computer network constructed in accordance with the teachings of the present invention.

Referring now to FIG. 1, a computer network 10 constructed in accordance with the teachings of the present invention will now be described in greater detail. As may now be seen, the computer network 10 is comprised of plural human interfaces 12-1 through 12-M, all of which are coupled to a common large scale computer such as file server 14. Each human interface 12-1 through 12-M is comprised of a video monitor 16, a keyboard 18, a mouse 20 and a printer 22, all of which are conventional devices, the operation of which are well known. It should be clearly understood that the configuration of the human interfaces 12-1 through 12-M are given by way of example. Accordingly, it is fully contemplated that other input/output (or "I/O") devices, for example, a joystick, trackball, touchpad or other device may be included as part of the human interface 14. Generally, for inclusion in the human interface 14, an I/O device should require, at a minimum, some type of physical interaction with a human during the primary operation thereof. It should also be understood that not all devices generally termed as "I/O devices" would be part of a human interface. For example, the primary interaction which occurs during use of a floppy or CD drive is between the computing system and a physical medium inserted into the drive. Accordingly, floppy and CD drives are not part of the human interface.

The file server 14 includes a processor subsystem 23 and a memory subsystem 25 coupled together by a bus for bi-directional exchanges of address, data and control signals therebetween. As illustrated in FIG. 1, the file server 14 further includes a main system bus 29 which couples the processor subsystem 23 and the memory subsystem 25. Alternately, the processor subsystem 23 and the memory subsystem 25 may be coupled together by a first local bus (not shown) therebetween. Also residing on the main system bus 29 is an I/O interface board 27 which, as will be more fully described below, couples the file server 14 with each of the human interfaces 12-1 through 12-M. Preferably, the I/O interface board 27 is coupled to the main system bus 29 by inserting the board into an available slot. Alternately, the I/O interface board 27 may be directly coupled to the processor subsystem 23 by a second local bus (also not shown) therebetween. In another alternate configuration, the I/O interface board 27 may be omitted. In this configuration, the processor subsystem 23 and the nodes $N_1$ through $N_m$ would reside on a common board, typically, the motherboard, and be coupled together by a local bus. It should be clearly understood the foregoing description of the file server 14 has been greatly simplified and that various devices and/or components of the file server 14 have been omitted from the drawing for ease of illustration.

In a conventionally configured computer system, the monitor, the keyboard, the mouse and the printer thereof would each be provided with a respective cable which terminates in a pin connector which, when inserted into a matching plug connector provided on a rear side surface (or "backplane") of a computing system, would respectively couple the monitor, the keyboard, the mouse and the printer to a main system bus of the computing system. Unlike conventionally configured computers, and in accordance with the teachings of the present invention, the video monitor 16, the keyboard 18, the mouse 20 and the printer 22 are all coupled to a downstream extension interface 24 by connector cables which respectively extend from the monitor 16, the keyboard 18, the mouse 20 and the printer 22 and plug into the downstream extension interface 24 in an manner identical to how those same cables would plug into the backplane of a conventionally configured computer. Preferably, the downstream extension interface 24 is configured as described in our co-pending U.S. patent application Ser. No. 09/072,382 (Atty. Docket No. 10393.47) filed on even date herewith entitled "Method for Incorporating Bi-Directional Computer Data into a Stream of Video Information and an associated Computer System having Remotely Located I/O Devices" and previously incorporated by reference.

The downstream extension interface 24 for each of the human interfaces 12-1 through 12-M is coupled to the file server 14 by a respective transmission line, preferably, a 4-wire cable 28 configured as described in our co-pending U.S. patent application Ser. No. 08/674,626 filed Jul. 3, 1996 entitled "Method and Apparatus for Enabling the Transmission of Multiple Wide Band Width Electrical Signals, assigned to the Assignee of the present application and hereby incorporated by reference as if reproduced in its entirety. More specifically, each respective 4-wire cable 28 couples the downstream extension interface 24 for each of the human interfaces 12-1 through 12-M to a corresponding node $N_1$ through $N_M$ located on the I/O interface board 27.

It is contemplated that each of the human interfaces 12-1 through 12-M may be located at either a separate workstation or in a separate office. It is further contemplated that each of the human interfaces 12-1 through 12-M shall be remotely located relative to the file server 14 and that the file server 14 be located in a room separate from the various human interfaces 12-1 through 12-M. If the file server 14 and the human interfaces 12-1 through 12-M are located in separate rooms, a separation distance of at least 10 feet will result. However, it is specifically contemplated that the file server 14 may be located hundreds, or even thousands, of feet from various ones of the human interfaces 12-1 through 12-M. Thus, by the term "remotely located", it is intended to refer to separation distances greater than those possible using conventionally designed cables such as those provided when purchasing a PC or other computing system. Accordingly, the term "remotely located", as used herein, generally refers to separation distances between 10 and 1,000 feet. However, as it is possible to utilize the disclosed techniques to separate the file server 14 and the human interfaces 12-1 through 12-M by distances greater than 1,000 feet, it should be clearly understood that the aforementioned upper limit of 1,000 feet is given by way of example and should not be construed as a limitation on the scope of the present invention.

Figure 2:
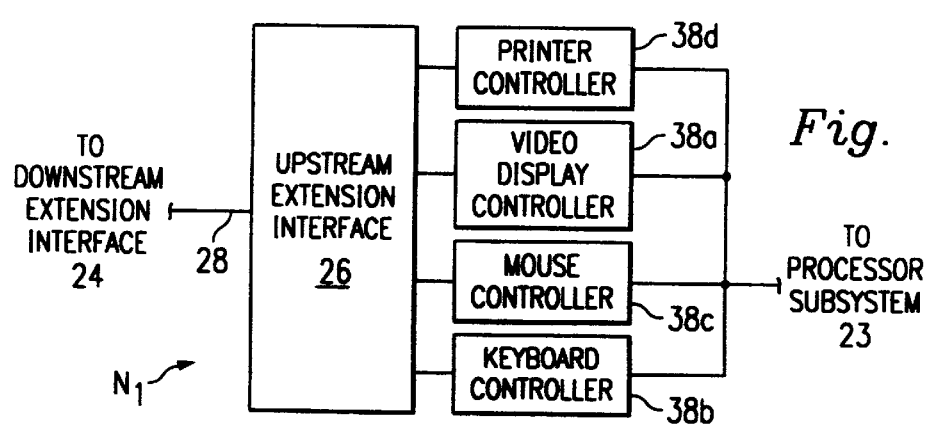
FIG. 2 is an expanded block diagram of a remote I/O interface card of the computer network of FIG. 1.

Referring next to FIG. 2, the node $N_1$ will now be described in greater detail. While only the node $N_1$ is shown in the drawing, it should be clearly understood that each of the nodes $N_2$ through $N_M$ are identically configured to the node $N_1$. Thus, the foregoing description of the interconnection of the human interface 12-1 and the file server 14 is equally descriptive of the interconnection of the human interfaces 12-2 through 12-M to the file server 14. More specifically, the 4-line wire 28 couples the downstream extension interface 24 of the human interface 12-1 to an upstream extension interface 26 forming part of the node $N_1$. Preferably, the upstream extension interface 26 is configured as described in our co-pending U.S. patent application Ser. No. 09/072,382 (Atty. Docket No. 10393.47) filed on even date herewith entitled "Method for Incorporating Bi-Directional Computer Data into a Stream of Video Information and an associated Computer System having Remotely Located I/O Devices" and previously incorporated by reference. Located between the upstream extension interface 26 of the node $N_1$ and the main system bus 29 are a series of controllers which includes a video display controller 38a, a keyboard controller 38b, a mouse controller 38c and a printer controller 38d. The video display controller 38a, the keyboard controller 38b, the mouse controller 38c and the printer controller 38d control the operation of the video monitor 16, the keyboard 18, the mouse 20 and the printer 22, respectively, by handling exchanges between those devices and the processor subsystem 23. To do so, the video display, keyboard, mouse and printer controllers 38a–d typically contain the device specific information needed by the processor 23 to interact with the video monitor 16, the keyboard 18, the mouse 20 and the printer 22, respectively, for example, when executing a software program. It is contemplated that the video display, keyboard, mouse and printer controllers 38a–d may be implemented in either hardware or software. If implemented in software, the controllers 38a–d would be referred to as drivers.

Thus, as shown by FIGS. 1 and 2 in combination, multiple upstream extension interfaces 26, each forming a portion of a respective node $N_1$ through $N_M$, reside on a common I/O interface board 27. However, it should be clearly understood that the configuration of the interconnection between each of the remotely located human interfaces 12-1 through 12-M and the file server 14 is the same as the interconnection described in Ser. No. 09/072,382 (Atty. Docket No. 10393.47). Specifically, each one of the remotely located human interfaces 12-1 through 12-M forming part of the computer network 10 are separately coupled to the file server 14 by an interconnection structure comprised of a upstream extension interface 26 which plugs into the main system bus 29 of the file server 14, a downstream extension interface 24 into which the various devices (the video monitor 16, the keyboard 18, the mouse 20 and the printer 22) forming one of the human interfaces 12-1 through 12-M are plugged and a 4-wire cable 28 which couples the upstream and downstream extension interfaces 26 and 24.

Figure 3A:
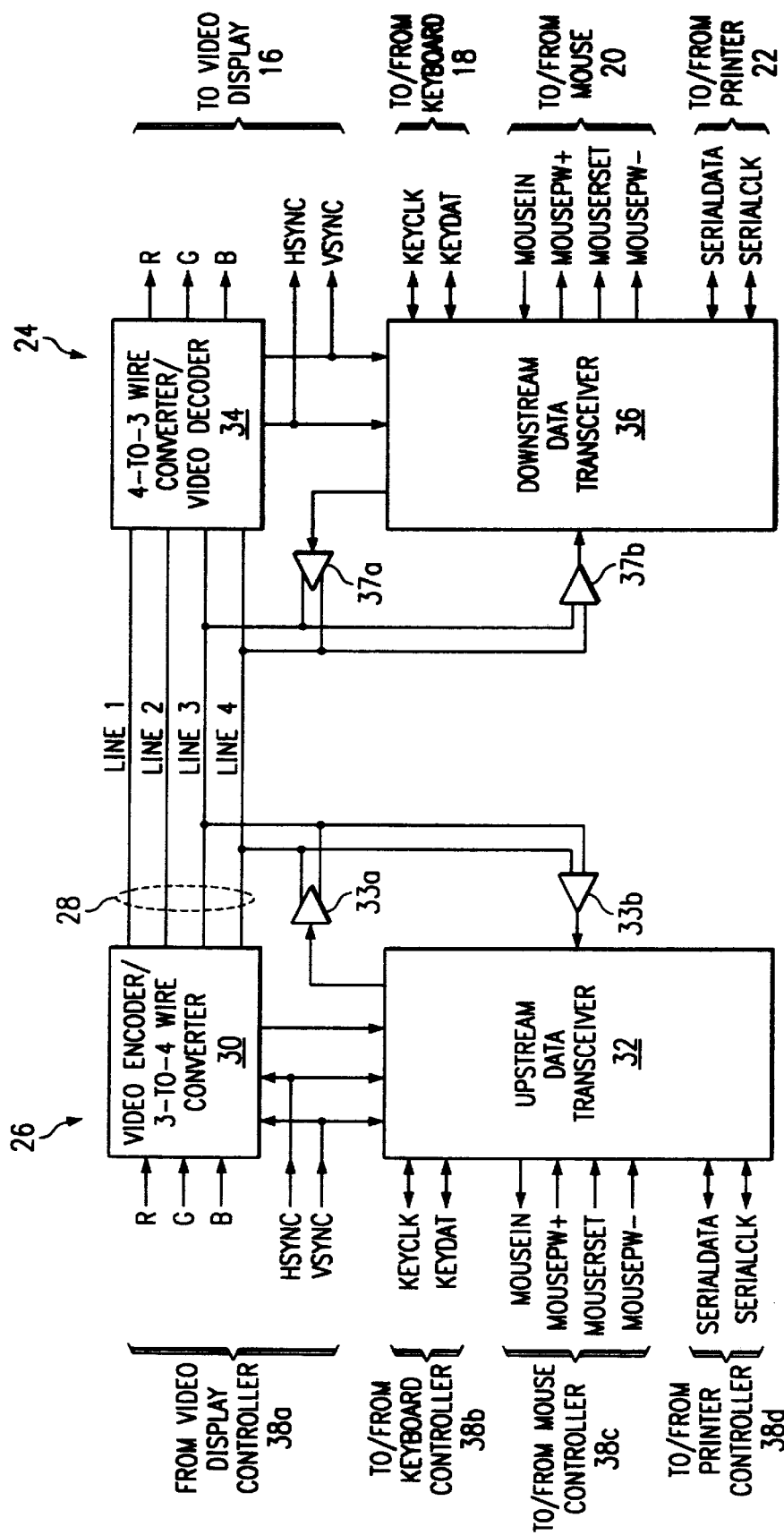
FIG. 3a is an expanded block diagram of upstream extension and downstream extension interfaces for a selected human interface of the computer network of FIG. 1.

Referring next to FIG. 3a, the downstream and upstream extension interfaces 24 and 26 will now be described in greater detail. As may now be seen, the upstream extension interface 26 is comprised of a video encoder/3-to-4 wire converter 30 and an upstream data transceiver 32. Similarly, the downstream extension interface 24 is comprised of a 4-to-3 wire converter/video decoder 34 and a downstream data transceiver 36. The video encoder/3-to-4 wire converter 30 receives video signals, specifically, red (or "R"), green (or "G"), blue (or "B"), horizontal synchronization (or "HSYNC") and vertical synchronization (or "VSYNC"), generated by video display controller 38a in response to a series of signals received from the processor subsystem 23, and transmits these signals downstream over lines 1–4 of the 4-wire cable 28 in a manner to be more fully described below. The upstream data transceiver 32 receives digital data from keyboard controller 38b, mouse controller 38c and printer controller 38d in response to respective series of signals generated by the processor subsystem 23 and pre-processes the received digital data to make it suitable for injection onto lines 3 and 4 of the 4-wire cable 28 by the transmitter 33a. The 4-to-3 wire converter/video decoder receives the signals transmitted over lines 1–4 of the 4-wire cable 28 and removes the R, G, B, HSYNC and VSYNC signals therefrom for transmission to the video display 16. The downstream data transceiver 36 receives the combined video/data signal being transmitted along lines 3 and 4 of the 4-wire cable 28 from a receiver 37b, removes the digital data therefrom for transmission to the various I/O devices such as the keyboard 18, the mouse 20 and the printer 22 which form part of the human interface 12-1. The downstream data transceiver 36 also receives digital data from the various I/O devices such as the keyboard 18 and the mouse 20 for transmission to the processor subsystem 23. The downstream data transceiver 36 pre-processes the received data to make it suitable for injection onto lines 3 and 4 of the 4-wire cable 28 by the transmitter 37a while the upstream data transceiver 32 receives the combined video/data signal from a receiver 33b and removes the digital data therefrom for transmission to the processor subsystem 23.

More specifically, the video encoder/3-to-4 wire converter 30 is comprised of a video encoder circuit coupled to a 3-to-4 wire converter circuit. Input to the video encoder circuit are the R, G, B, HSYNC and VSYNC signals. The video encoder circuit is described and illustrated in U.S. patent application Ser. No. 08/935,968 filed Sep. 23, 1997 entitled "Video Data Transmission and Display System and Associated Methods for Encoding/Decoding Synchronization Information and Video Data", assigned to the Assignee of the present invention and hereby incorporated by reference as if reproduced in its entirety. As disclosed in the above-referenced application, the video encoder circuit combines the R and HSYNC signals into a first combined signal R+HSYNC, combines the B and VSYNC signals into a second combined signal B+VSYNC and passes the G signal without modification.

The R+HSYNC, B+VSYNC and G signals output the video encoder circuit are transmitted to the 3-to-4 line converter circuit where the three signals are placed on lines 1–4 of the 4-wire cable 28 for balanced-mode transmission to the human interface 14. The 3-to-4 wire converter circuit is described and illustrated in co-pending U.S. patent application Ser. No. 08/674,626 filed Jul. 3, 1996, entitled "Method and Apparatus for Enabling the Transmission of Multiple Wide Bandwidth Electrical Signals", assigned to the Assignee of the present invention and hereby incorporated by reference as if reproduced in its entirety. Each of lines 1–4 is comprised of a twisted pair of wires onto which (R+HSYNC)+ and G+ are respectively placed for line 1, (R+HSYNC)– and G+ are respectively placed for line 2, (B+VSYNC)+ and G– are respectively placed for line 3 and (B+VSYNC)– and G– are respectively placed for line 4 of the 4-wire cable 28 for balanced mode transmission to the 4-to-3 wire converter/video decoder 34.

In addition to generating video information to be transmitted to the video monitor 16, the processor subsystem 23, together with the associated controllers 39a–d, also generates digital data signals to be propagated to the various I/O devices forming a portion of the human interface 12-1. These signals are transmitted to the upstream data transceiver 32 for preprocessing prior to propagation to the human interface 12-1 over the 4-wire cable 28. They include a keyboard clock signal KeyClk, a bi-directional keyboard line that either clocks data into or out of the keyboard 18, a keyboard data signal KeyDat, a bi-directional keyboard line that carries the data being clocked into or out of the keyboard 18, MouseIn, a line that carries data from the mouse 20 to the processor subsystem 23, MousePW+, a line which carries positive power from the processor subsystem 23 to the mouse 20, MouseRset, a signal from the processor subsystem 23 which instructs the mouse 20 to send a packet of data which identifies the manufacturer of the mouse 20 to the processor subsystem 23, MousePW–, a line which carries negative power from the processor subsystem 23 to the mouse 20, SerialClk, a bi-directional line that clocks data into or out of a serial device such as the printer 22 and SerialData, a bi-directional line that carries the data being clocked into or out of the printer 22 or other serial device. Of these, the SerialClk and SerialData lines will not be discussed further as the allocation of the stream of video information does not include an allocation of blanking pulses for the printer 22 or other serial device.

Prior to being injected into the video information output by the video encoder/3-to-4 wire converter 30, digital data propagated from the processor subsystem 23 to the upstream data transceiver 32 must first be preprocessed. As will be more fully described below, the upstream data transceiver 32 uses the HSYNC and VSYNC signals received from the processor subsystem 23 to pre-process the digital data destined for the various I/O devices of the human interface 12-1 such that the data signals are suitable for injection into the stream of video information being propagated along lines 3 and 4 of the 4-wire cable 28 by the upstream transmitter 33a.

Figure 3B:
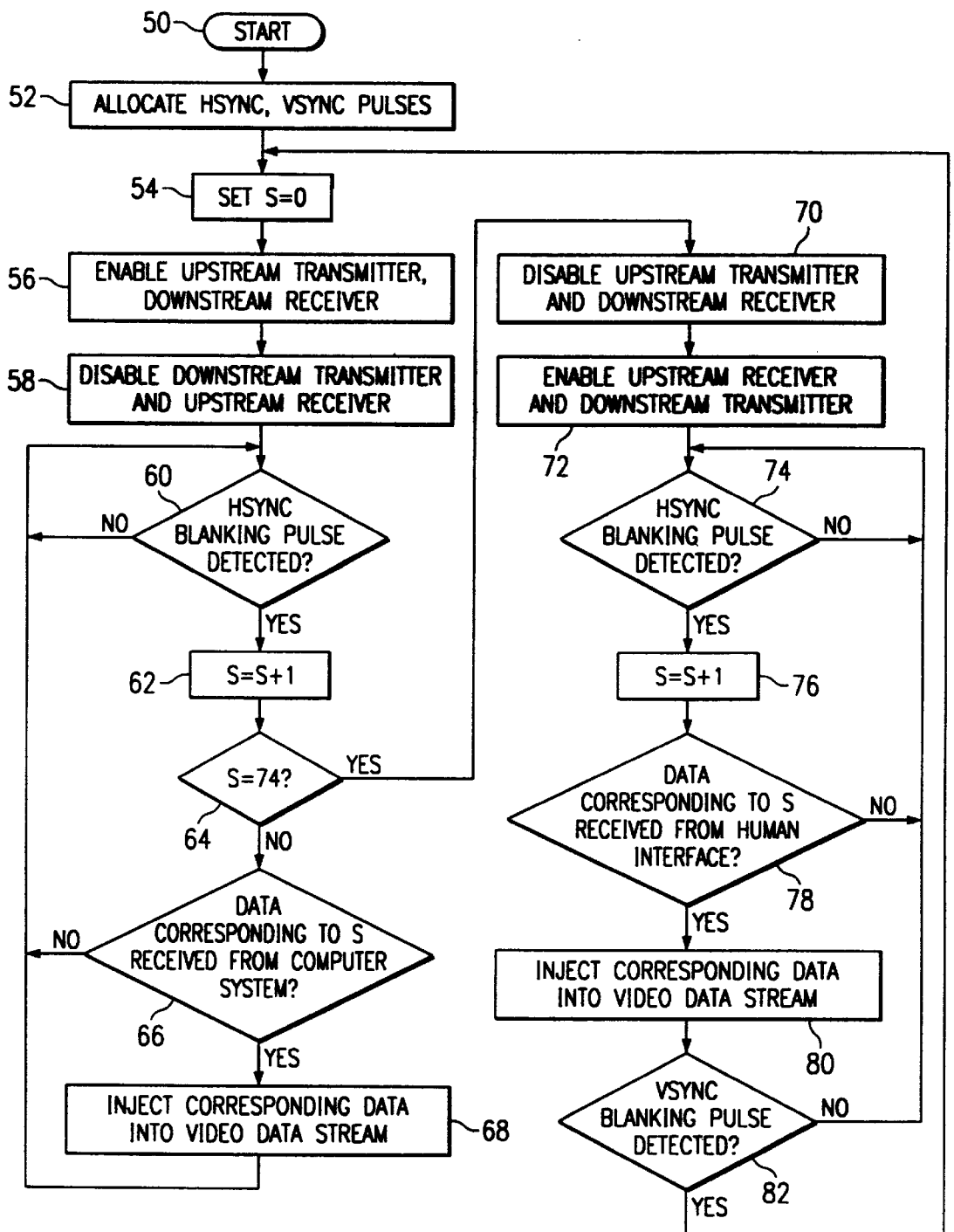
FIG. 3b is a flow chart of a method for bi-directionally injecting digital data into and removing digital data from an analog stream of video information.

Referring next to FIG. 3b, the method of injecting digital data into an analog stream of video information in accordance with the teachings of the present invention will now be described in greater detail. As described herein, the method discloses the injection of digital data into an analog stream of video information for a video display operating in VGA mode where a frame of video is comprised of 480 lines. It should be clearly understood that the described method is purely exemplary and that the invention is equally suitable for use with video displays operating in other modes, for example, SVGA, XVGA, SXVGA or others.

The method commences at step 50 and, at step 52, selected ones of the HSYNC and VSYNC pulses are allocated to selected types of digital data. More specifically, for a video display operating in the VGA mode, there are 480 lines of video in each frame. At the end of each line, each of the R, G and B signals undergoes a blanking interval commonly referred to as an HSYNC pulse. In accordance with the teachings of the present invention, each of the HSYNC pulses which follows a line of video may be allocated to a type of digital computer data. One such allocation of the 480 lines of a frame 39 of video may be seen by reference to FIG. 3c. Here, lines 0–9 of the frame 39 are reserved, lines 10–73 are allocated to digital data traveling downstream from the processor subsystem 23 to the human interface 12-1, lines 74–79 are reserved, lines 80–143 are allocated to digital data traveling upstream from the human interface 12-1 to the processor subsystem 23 and lines 144–480 are reserved.

Reserved lines 0–9 provide a guard area prior to injection of downstream digital data into the stream of video information. Of the 63 lines reserved for digital data traveling downstream from the processor subsystem 23 to the human interface 12-1, lines 10–12 are reserved for mouse set-up information, lines 13–32 are reserved for mouse data, lines 33–34 are reserved for downstream testing of the line, lines 35–61 are reserved for future use and lines 52–63 are reserved for keyboard data. Reserved lines 74–49 provide a guard area separating downstream and upstream data. Of the 63 lines reserved for digital data traveling upstream from the human interface 12-1 to the processor subsystem 23, lines 80–82 are allocated to carry mouse set-up information, lines 83–102 are allocated for carrying mouse data, lines 103–104 are allocated for upstream testing of the line, lines 105–131 are reserved for future uses and lines 132–143 are allocated for carrying keyboard data.

As previously stated, a video display operating in VGA mode uses images comprised of 480 lines of video (and 480 HSYNC blanking pulses) per frame. Frame rates for video displays operating in VGA mode range between 60 and 115 frames per second. Thus, for a frame rate of 60, 28,800 blanking pulses occur every second. If each blanking pulse contains one bit of digital data, a data transfer rate of 28.8 kbps could be achieved in a uni-directional data transfer. Of course, the data transfer rates are substantially lower when the frames of video are allocated in the above-described manner.

The above-described allocation of each frame of a stream of video information provides for bi-directional transfers of data between the processor subsystem 23 and the keyboard 18 and between the processor subsystem 23 and the mouse 20. It should be clearly understood, however, that the stream of video information may be allocated differently than that specifically disclosed herein without departing from the scope of the present invention. Additional devices may be supported by modifying the allocation of lines of video. For example, to provide for bi-directional transfers of data between the computing system 12 and the printer 22, additional lines of each frame 39 would need to be allocated for downstream and upstream data transfers of printer data. Additionally, depending on the resolution of a video monitor, the number of lines of video data contained in a frame may vary. Finally, additional data may be injected into the video information stream by allocating the VSYNC blanking pulse which separates frames of video to yet another type of digital data.

After allocating specific digital data signals to selected lines of the analog video information stream, the downstream extension interface 24 is ready to receive video information from the upstream extension interface 26 and both the upstream and downstream extension interfaces 26 and 24 are ready to transmit and/or receive digital data from the other. At this point, the video encoder/3-to-4 wire converter may at any time begin to receive R, G and B signals from the processor subsystem 23, the video encoder/ 3-to-4 wire converter 30 and the upstream data transceiver 32 may begin to receive HSYNC and VSYNC signals from the processor subsystem 23, the upstream data transceiver 32 may begin to receive digital data from the processor subsystem 23, in the form of assertions of one or more of the KeyClk, KeyDat, MousePW−, MouseRset or MousePW+ lines, to be transmitted to the keyboard 18 and/or mouse 20. Finally, the downstream data transceiver 36 may begin to receive digital data from the keyboard 18 and/or mouse 20, here, in the form of assertions of one or more of the KeyClk, KeyDat or MouseIn lines. Each of the upstream and downstream data transceivers 32 and 36 include a memory subsystem (not shown) which temporarily holds the received digital data until instructed by a controller (also not shown) to inject the digital data into the stream of video information.

The method proceeds to step 54 where "S", a count of HSYNC blanking pulses is set to zero. As the S count is in the region where only digital data originating at the computer system 12 is to be transmitted downstream, at step 56, the upstream transmitter 33a and the downstream receiver 37b are enabled, for example, by the controllers respectively residing within the upstream data transceiver 32 and the downstream data transceiver 36. Proceeding to step 58, the downstream transmitter 37a and the upstream receiver 33b are disabled again, for example, by the controllers respectively residing in the downstream and upstream transceivers 36 and 32. Continuing on to step 60, the upstream data transceiver will now await the receipt of HSYNC and/or VSYNC blanking pulses from the processor subsystem 23. The receipt of an HSYNC blanking pulse indicates to the upstream data transceiver 32 that the processor subsystem 23 has completed transmission a line of video to the video encoder/3-to-4 wire converter 30 while the receipt of an VSYNC blanking pulse indicating to the upstream data transceiver 32 that the processor subsystem 23 has completed transmission of a 480 line frame of video.

At step 60, the upstream data transceiver 32 will await receipt of an HSYNC pulse from the processor subsystem 23. Upon receipt of an HSYNC pulse at step 60, the method will then proceed to step 62 where the upstream data transceiver 32 increments the S count by 1 and on to step 64 where the upstream data transceiver 32 determines whether the S count has reached 74. In accordance with the disclosed allocation of video lines, an S count of 74 indicates that downstream transmission of digital data produced by the processor subsystem 12 is complete and that upstream transmission of digital data originating at the keyboard 18 and the mouse 20 to the processor subsystem 23 should commence. Of course, other S counts within the guard band separating the downstream and upstream data may be used as indicating the transition between the two. Furthermore, it should be clearly understood that, if the allocation of video lines should differ from that disclosed herein, the S count indicating transition between downstream and upstream transmission of data would shift.

If the upstream data transceiver 32 determines at step 64 that the S count is below 74, the method proceeds to step 66 where the upstream data transceiver 32 determines if data corresponding to the present value of the S count has been received from the processor subsystem 23. For example, as data is received from the processor subsystem 23 over various ones of the KeyClk, KeyDat, MousePW−, MouseRset and MousePW+ lines, the upstream data transceiver 32 stores the received data, for example, within buffers coupled to the respective lines or at previously specified addresses within a larger memory subsystem. At step 66, the upstream data transceiver 32 retrieves from the computer data allocation table, the type of computer data to which the present S value has been allocated and determines whether the corresponding type of computer data has been received by examining the memory address or buffer where the corresponding type of computer data would have been stored.

If an examination of the memory address or buffer reveals that the so, the method proceeds on to step 68 where the upstream data transceiver 32 injects the bit of data (if the received data of the corresponding type is comprised of one bit) or the first bit of data (if the received data of the corresponding type is comprised of multiple bits) into the location, within the stream of video information allocated to the digital data to be injected thereinto. Injection of digital data into the stream of video information will now be described with reference to FIGS. 3d and 3e. FIG. 3e shows a first one of the stream of video information placed on the 4-wire cable 28 by the video encoder/3-to-4 wire converter, specifically, the R+HSYNC stream 40. As may now be seen, the R+HSYNC stream 40 is comprised of a series of analog signals 43, each of which describes a line of video, separated by a corresponding series of HSYNC pulse 44, each of which separates successive lines of video. During the time periods when the HSYNC signal pulses, none of the R, G or B streams carry any video data. These time periods are generally known as blanking pulses and may be found on each of the R, G and B video streams. Typically, the blanking pulses for one of the R, G and B video streams is used to keep track of line counts while the blanking pulses for the other two are ignored. Thus, since the 4-to-3 wire converter/video decoder 34 will ignore any data within the blanking pulses for the video streams not used to keep track of the HSYNC count, digital data may be inserted into these signals during the blanking pulses.

The insertion of digital data into a video information stream may be seen by reference to FIG. 3e. Here, the G video information stream 44 carried on lines 3 and 4 of the 4-wire cable 28 may be seen. Like R and B, the G video information stream 44 is comprised of series of analog signals 45, each of which describes a line of video, separated by a corresponding series of blanking pulses 46, each of which separates successive lines of video. Within each of the blanking pulses, a bit of data of data may be selectively inserted. For example, in FIG. 3e, the upstream data transceiver 32 has inserted a "101" inside the blanking pulses 46. If, for example, the illustrated blanking pulses 46 were blanking pulses 10–12, the "101" would be mouse set-up information being generated by the processor subsystem 23 for propagation to the mouse 20. The upstream data transceiver 32 injects data contained at specified locations or buffers into the blanking pulse allocated thereto by, upon detecting that a memory location or buffer matching the S count of blanking pulses contains data, writing the data contained at that location or buffer to the data transmitter 33a which, in turn, generates two identical signals and directly injects the signal on each of lines 3 and 4 of the 4-wire cable 28 in differential mode during the allocated blanking pulses, such that the 4-wire cable 28 is carrying both the stream of video information output the video encoder/3-to-4 wire converter 30 and the digital data output the data transmitter 33a. For example, the digital data may be inserted into blanking pulses occurring during the G information streams on respective ones of the twisted pairs which comprise the lines 3 and 4.

Returning now to FIG. 3b, upon injection of the data bit into the G video streams on lines 3 and 4 at step 68 or, if the upstream data transceiver 32 determines at step 66 that no data corresponding to the S count has been received from the processor subsystem 23, the method returns to step 60 where the upstream data transceiver 32 awaits detection of a next HSYNC blanking pulse. The method would then loop through steps 60, 72, 64, 66 and 68 until the S count reaches 74. During this period, the video information stream may begin arriving at the 4-to-3 wire converter/video decoder 34. The precise time of arrival would depend, however, on the length of the 4-wire cable 28. The arrival time, which is generally referred to as the "time of flight", is approximately 1.5 times the length of the 4-wire cable 28 (in feet) nanoseconds. For example, if the 4-wire cable is 1,000 feet long, the time of flight would be about 1.5 $\mu$seconds. As the video information stream arrives, the video decoder/4-to-3 converter separates the R, G, B, HSYNC and VSYNC signals therefrom and propagates these signals to the video monitor 16. The 4-to-3 wire converter/video decoder 34 also transfers the HSYNC and VSYNC signals to the downstream data transceiver 36. More specifically, the 4-to-3 converter circuit portion of the 4-to-3 converter/video decoder receives the stream of video information and, in a manner more fully described in co-pending U.S. patent application Ser. No. 08/674,626 filed Jul. 3, 1996 and previously incorporated by reference, provides, as outputs therefrom, the R+HSYNC signal, the G and the B+VSYNC signals. The R+HSYNC, G and B+VSYNC signals are propagated from the 4-to-3 converter circuit to the video decoder circuit. There, in the manner more fully described co-pending U.S. patent application Ser. No. 08/935,968 filed Sep. 23, 1997 and previously incorporated by reference, the video decoder provides, as output therefrom, the R, HSYNC, B, VSYNC and G signals.

The downstream data receiver 37b removes the G information stream containing the digital data from both of lines 3 and 4 and provides, as its output, the G information stream. By receiving the G information stream from both of lines 3 and 4, noise on the lines may be detected as any differential between the signals respectively received on the lines 3 and 4, thereby providing noise immunization, as well as reduced EMI radiation levels. The G video information stream is then transmitted to the downstream data transceiver 36 where the digital data injected thereto is removed. Specifically, each time the downstream data transceiver receives a HSYNC pulse from the 4-to-3 wire converter/video decoder 34, the downstream data transceiver 36 will examine the corresponding blanking pulse in the G video information stream and, if the G video information stream goes high during the blanking pulse, the downstream data transceiver will transmit a "1" along the KeyClk, KeyDat, MousePW+, MouseRset or MousePW− which normally carries data for the type of information to which the HSYNC pulse was allocated.

Returning now to step 64, when the S count reaches 74, the downstream transmission of digital data from the processor subsystem 23 to the downstream transceiver 36 has been completed and the upstream transmission of digital data from the keyboard 18 and the mouse 20 commences. The method then proceeds on to step 70 where the upstream transmitter 33a and the downstream receiver 37b are disabled and on to step 72 where the downstream transmitter 37a and the upstream receiver 33b are enabled, again by controllers respectively residing within the upstream and downstream data transceivers 32 and 36. The method then proceeds to step 74 where the downstream data transceiver 36 awaits receipt of an HSYNC blanking pulse from the 4-to-3 wire converter/video decoder 34.

Upon receipt of an HSYNC pulse at step 74, the method will then proceed to step 76 where the downstream data transceiver 36 increments the S count by 1 and on to step 78 where the downstream data transceiver 36 determines if data corresponding to the present value of the S count has been received from the keyboard 18 or mouse 20. For example, as data is received from the processor subsystem 23 over various ones of the KeyClk, KeyDat and MouseIn lines, the downstream data transceiver 36 stores, for example, within buffers coupled to the respective lines or at previously specified addresses within a larger memory subsystem. At step 78, the downstream data transceiver 36 retrieves from the computer data allocation table, the type of computer data to which the present S value has been allocated and determines whether the corresponding type of computer data has been received by examining the memory address or buffer where the corresponding type of computer data would have been received.

If an examination of the memory address or buffer reveals that the corresponding type of computer data has been received, the method proceeds on to step 80 where the downstream data transceiver 36 injects the bit of data (if the received data of the corresponding type is comprised of one bit) or the first bit of data (if the received data of the corresponding type is comprised of multiple bits) into the HSYNC blanking pulse, within the stream of video information allocated to the digital data to be injected thereinto. Injection of digital data into the stream of video information is accomplished in a manner identical to that previously described. More specifically, the downstream data transceiver 36 injects data contained at specified locations in memory or in buffers into the blanking pulses of the video information stream allocated thereto by, upon detecting that a memory location or buffer matching the S count of blanking pulses contains data, writing the data obtained at that location or buffer to the data transmitter 37a which, in turn, generates two identical signals and directly injects the signal on each of lines 3 and 4 of the 4-wire cable 28 in differential mode during the allocated blanking pulses, such that the 4-wire cable 28 is carrying both the stream of video information output the video encoder/3-to-4 wire converter 30 and the digital data output the data transmitter 33a. For example, the digital data may be inserted into blanking pulses occurring during the G streams on respective ones of the twisted pairs which comprise the lines 3 and 4.

Upon injection of the data bit into the G video information streams on lines 3 and 4 at step 80 or, if the upstream data transceiver 32 determines at step 78 that no data corresponding to the S count has been received from the keyboard 18 or the mouse 20, the method returns to step 74 where the downstream data transceiver 36 awaits detection of a next HSYNC blanking pulse. The method would then loop through steps 74, 76, 78, 80 and 82 until a VSYNC blanking pulse is detected at step 82. During this period, the digital data injected onto the lines 3 and 4 may begin arriving at the upstream data receiver 33b. In this regard, it should be noted that, while the injected data will also arrive at the 4-to-3 converter/video decoder 34 and the downstream receiver 37b, neither will detect the digital data injected into the video stream at the downstream location since the 4-to-3 converter/video decoder ignores all data located within the blanking pulses while the downstream receiver 37a was previously disabled. As before, the precise time of arrival of the injected digital data at the upstream receiver 33b will depend on the length of the 4-wire cable 28 and, as previously stated will be about 1.5 $\mu$seconds if the 4-wire cable 28 is 1,000 feet long.

Unlike the downstream case, the removal of digital data at the upstream location introduces certain complications. In the downstream case, the video information stream in which the digital data had been injected and the HSYNC pulse sequence arrived at the downstream data transceiver 36 at the same time. In other words, both were subject to the delay caused by "time of flight". As a result, the HSYNC pulse sequence count could be used to identify digital data located within the blanking pulses for removal. At the upstream location, however, the HSYNC pulse sequence is provided by the video encoder/3-to-4 wire converter 30 located upstream while the video information stream into which digital data had been inserted is provided by the upstream data receiver 33b. As a result, therefore, only the video information stream has been delayed due to the time of flight. In this case, the HSYNC pulse sequence count cannot be used.

The upstream data receiver 33b removes the G information stream containing the digital data from both of lines 3 and 4 and provides, as its output, the G information stream. By receiving the G information stream from both of lines 3 and 4, noise on the lines may be detected as any differential between the signals respectively received on the lines 3 and 4, thereby providing noise immunization, as well as reduced EMI radiation levels. The G video information stream is then transmitted to the upstream data transceiver 32 where the digital data injected thereto is removed. Specifically, the upstream data transceiver 32 receives, from the video encoder/3-to-4 wire converter 30, the same G video information stream which is placed on lines 3 and 4 of the 4-wire cable 28. The upstream data transceiver 32 must first align the two G video information streams, for example by aligning the blanking pulses. Once aligned, the upstream data transceiver 32 can identify digital data injected into the G video information stream received from the upstream data receiver 33b by comparing the two G video information streams to identify differences therebetween. The upstream data transceiver 32 identifies in which blanking pulses of the G video information stream received by the upstream data receiver 33b, the G video information stream goes high, and transmits a "1" along the KeyClk, KeyDat or MouseIn which normally carries data for the type of information to which that HSYNC pulse was allocated.

Returning to step 82, when a VSYNC blanking pulse is detected, this indicates that a complete frame of video information has been transmitted from the processing subsystem 23 to the video monitor 16. The method then returns to step 54 where the S count is reset to 0 and transmission of the next frame of video information to the video monitor begins. The method will then continuously loop through steps 54 through 82 until transmission of video information from the processor subsystem 23 to the video monitor 16 ends, for example, at power-down of the file server 14.

Referring next to FIG. 4, the memory subsystem 25 will now be described in greater detail. Preferably, the memory subsystem 25 is relatively large. For example, a 20 Gigabyte memory may be suitable for the purposes contemplated herein. As may now be seen, the memory subsystem 25 is divided into memory areas 25-1 through 25-M. Each memory area 25-1 through 25-M corresponds to one of the human interfaces 12-1 through 12-M coupled to the file server 14. Stored at each of the memory areas 25-1 through 25-M is the software which may be executed by the processor subsystem 23 and the data which may be retrieved from and/or placed into memory in response to execution of the software and/or issuance of appropriate instructions at the corresponding human interface 12-1 through 12-M.

More specifically, the processor subsystem 23 associates each one of the memory areas 25-1 through 25-M with a corresponding one of the nodes $N_1$ through $N_M$ residing on the I/O interface board 27. Whenever the processor subsystem 23 receives address, data or control signals from one of the nodes $N_1$ through $N_M$ (which originated at the corresponding human interface 12-1 through 12-M), in responding to the received signal, the processor subsystem 23 executes the software stored in and/or performs other types of accesses to, the corresponding memory area 25-1 through 25-N. By maintaining, in discrete areas 25-1 through 25-N of the memory subsystem 25, all of the software to be executed by the processor subsystem 23 in response to instructions received by a corresponding one of the plural human interfaces 12-1 through 12-M, the processor subsystem 23 may be viewed as plural computing systems, one corresponding to each one of the nodes $N_1$ through $N_M$ and associated human interfaces 12-1 through 12-M.

For example, when the processor subsystem 23 receives data or control signals from the human interface 12-1 via the node $N_1$, the processor subsystem 23 executes software stored in the memory area 25-1 of the memory subsystem 25 which, when loaded, would handle the received signals. If the received signals involve a read or write operation, the processor subsystem 23 would access specified locations within the first memory area 25-1 of the memory subsystem 25. Similarly, the processor subsystem 23 would utilize information maintained in the memory area 25-2 when processing address, data or control signals received from the human interface 12-2 and would utilize information maintained in the memory area 25-M when processing address, data or control signals received from the human interface 12-M. In this manner, while the computer network 10 includes only one computing system (the file server 14), as the processor subsystem 23 presents itself to each one of the human interfaces 12-1 through 12-M as being dedicated to that human interface, the computer network 10 may be viewed as being comprised of M virtual computing systems, each tied by a single I/O interface board 27 to a discrete remotely located human interface.

Preferably, the processor subsystem 28 would be a microprocessor capable of conducting operations at sufficiently high speeds such that the processor subsystem could handle bi-directional exchanges of video and computer data with plural human interfaces. For example, a P6 slot 2 microprocessor having an operating speed of at least 400 MHz should be suitable for the uses contemplated herein. Generally, a microprocessor of the aforementioned size should be able to perform discrete operations, each using a discrete area of the memory subsystem 25, in response to signals received from between 8 and 10 human interfaces. Depending on the particular microprocessor selected, operations performed on behalf of various ones of the human interfaces 12-1 through 12-M may be performed sequentially using a time-share processing technique or simultaneously using a parallel processing technique. Of course, the number of human interfaces which may be serviced by the processor subsystem 23 will vary depending on the speed of the microprocessor. Generally, however, the faster the microprocessor and the less number of human interfaces being served by the microprocessor, the faster the "speed" of each virtual computing system. It is expected that microprocessors which will become commercially available in 1998 will be capable of processing instructions at sufficiently high speeds such that as many as 20 human interfaces may be serviced by a single microprocessor without noticeable processing delays.

It should be noted that, as shown in FIG. 4, each of the memory areas 25-1 through 25-M appear to be of equal size.

It is contemplated, however, that the size of each memory area 25-1 through 25-N may be varied, depending on the computing needs of the user at the associated human interface 12-1 through 12-M. For example, the user of the human interface 12-1 may need to perform tasks using both word processing and spreadsheet applications. The user of the human interface 12-2, on the other hand, may only need to use the word processing application. In this situation, the memory area 12-1 should be sufficiently larger than the memory area 12-2 such that the memory area 12-1 can accommodate both the word processing and spreadsheet applications, as well as all documents produced using either of the two applications, while the memory area 12-2 need only accommodate the word processing application and all documents produced thereby. It is recognized that by placing duplicate software in various ones of the memory areas 12-1 through 12-M, a certain amount of memory may be unnecessarily consumed. However, in light of the substantial reductions in the cost of memory in recent years, such a configuration is preferable over the use of a single "network" copy to be shared and/or copied by multiple users. It should be further noted that, if larger memory areas are dedicated to a remotely located human interface, the resultant virtual computing system will have greater capabilities.

By implementing a computer network in the manner described herein, various advantages are achieved. In that a single processor subsystem serves the entire computer network, the network has been simplified considerably. Furthermore, the simplification would be transparent to the various users of the network since the processor subsystem, in conjunction with the memory subsystem, represents itself to each user as a virtual computing system dedicated to that individual user. Each user has use, therefore, of a virtual computing system which may be customized by the network administrator to match the unique needs of each user. Finally, as both the processor subsystem and the memory subsystem are remotely located relative to each one of the users of the computer network, no user could load unauthorized software onto, or copy data from, the computing system.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A computer network, comprising:
    a processor subsystem;
    a plurality of nodes, each one of said plurality of nodes coupled to said processor subsystem and having a remotely located human interface comprised of a video monitor and an input/output ("I/O") device coupled thereto;
    a transmission line;
    each one of said plurality of nodes including a first interface device coupled to said processor subsystem and to said transmission line and each one of said human interfaces including a second interface device coupled to said video monitor, said I/O device and said transmission line;
    a memory subsystem coupled to said processor subsystem, said memory subsystem including a plurality of memory areas, each corresponding to one of said plurality of nodes;
    said processor subsystem using information stored in each one of said plurality of memory areas to appear, to said corresponding one of said plurality of nodes, as a dedicated processor for said human interface coupled to said node;
    said first interface device comprising:
        a video encoder coupled to said processor subsystem and said transmission line, said video encoder placing a stream of video information received from said processor subsystem onto said transmission line;
        a first transceiver coupled to said processor subsystem and said transmission line, said first transceiver injecting a first set of data signals received from said processor subsystem into said stream of video information;
    said second interface comprising:
        a video decoder coupled to said transmission line to receive said stream of video information and to said video monitor; and
        a second transceiver coupled to said transmission line and said I/O device, said second transceiver receiving said stream of video information in which said first set of data signals were injected and removing said first set of data signals from said stream of video information;
        said second transceiver receiving a second set of data signals from said I/O device and injecting said second set of data signals into said stream of video information;
        said first transceiver receiving said stream of video information in which said second set of data signals were injected and removing said second set of data signals from said stream of video.

2. A computer network according to claim 1 wherein said first transceiver receives at least one synchronization pulse sequence from said processor subsystem and injects said first set of data signals into said stream of video information based upon a first count of blanking pulses in said at least one received synchronization pulse sequence.

3. A computer network according to claim 2 wherein said second transceiver is coupled to said video decoder to receive said at least one synchronization pulse sequence therefrom and removes said first set of data signals from said stream of video information based upon a second count of blanking pulses in said at least one received synchronization pulse sequence.

4. A computer network according to claim 3 wherein said second transceiver injects said second set of data signals into said stream of video information based upon said second count of blanking pulses in said at least one received synchronization pulse sequence.

5. A computer network according to claim 4 wherein said first transceiver receives said stream of video from said video encoder and wherein said first transceiver removes said second set of data signals from said stream of video information based upon a comparison of said stream of video received from said video encoder and said stream of video information received from said transmission line.

6. A computer network according to claim 5 wherein said plurality of nodes reside on an I/O interface card coupled to said processor subsystem.

7. A computer network according to claim 6 and further comprising a main system bus which couples said processor subsystem and said memory subsystem, said main system bus having a slot in which said I/O interface card is insertably mounted.

* * * * *